United States Patent [19]

Shaw et al.

[11] 4,456,377
[45] Jun. 26, 1984

[54] MULTIMODE FIBER OPTIC ROTATION SENSOR

[75] Inventors: H. John Shaw, Stanford; George A. Pavlath, Woodside, both of Calif.

[73] Assignee: The Board of Trustees of Leland Stanford Jr. Univ., Stanford, Calif.

[21] Appl. No.: 318,813

[22] Filed: Nov. 6, 1981

[51] Int. Cl.³ .......................... G01C 19/64; G01B 9/02
[52] U.S. Cl. .................................................. 356/350
[58] Field of Search ........................................ 356/350

[56] References Cited

U.S. PATENT DOCUMENTS 3,102,953 9/1963 Wallace ............................... 356/350
3,395,270 7/1968 Speller ................................. 356/350

OTHER PUBLICATIONS

"Fiber-Optic Rotation Sensing With Low Drift", Ulrich, Optics Letters, vol. 5, No. 5, May 1980, pp. 173-175.

"Sag Nac-Fiber-Ring Interferometer Gyro With Electronic Phase Sensing Using a (GaAl)As Laser", Thompson et al., Appl. Phys. Lett., 33, (11), Dec. 1, 1978, pp. 940-941.

Primary Examiner—Vincent P. McGraw
Attorney, Agent, or Firm—Knobbe, Martens, Olson & Bear

[57] ABSTRACT

A fiber optic rotation sensor utilizes multimode optical fiber to improve power coupling and reduce coherent back scattering. A multimode light source such as a light emitting diode can be used. The system is economical and environmentally stable.

4 Claims, 4 Drawing Figures

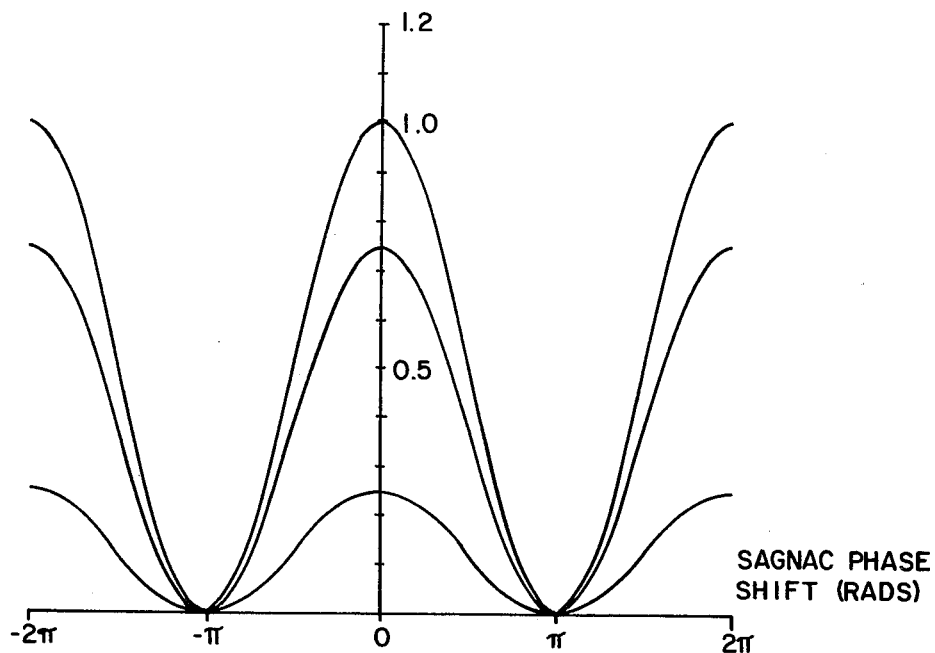
FIG.—1
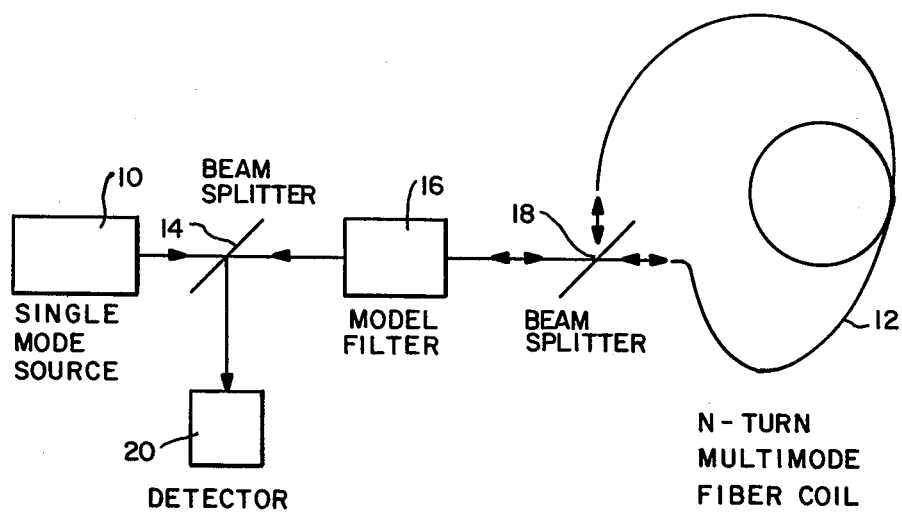
FIG.—2

MULTIMODE FIBER OPTIC ROTATION SENSOR

The United States Government has rights in this invention pursuant to contract F49620-80-C-0040 awarded by the United States Air Force Office of Scientific Research.

This invention relates generally to rotation sensors such as gyroscopes, and more particularly the invention relates to a fiber optic rotation sensor.

Optical gyroscopes employing ring interferometers are known which can perform the function of mechanical gyroscopes.

Presently, much effort is being directed to producing technically and commercially feasible fiber optic rotation sensors which would be more compact, lightweight, and inexpensive than conventional ring interferometers which employ mirrors.

Optical gyroscopes utilize the Sagnac effect in a ring interferometer. The fiber optic rotation sensor has a length of optical fiber wound in coils around an area. In the presence of rotation of the coil, counter-directional optical waves propagating around the coils experience the Sagnac phase shift. This is a relativistic phenomenon since the time for light to travel through the fiber is longer in one direction than in the other direction due to the rotation of the coils. The intensity of the combined light is a function of the phase difference between the two light waves which travel the same path but in opposite directions, and the output of a light detector is proportional to the intensity of the combined light.

Heretofore, a single transverse mode polarized light beam has been split and applied to the fiber loop as the contradirectional optical waves. However, a non-rotationally induced differential phase shift is present in such fiber optic rotation sensors if the polarization in the optical fiber is not conserved or controlled. This phase shift is caused by residual birefringence in the optical fiber. The phase shift can be quite large and very sensitive to the environment. While the phase shift can be minimized or eliminated by correct use of a polarization analyzer, environmentally produced amplitude variations or scale factor variations can still remain.

More recently, as described in applicant's copending application Ser. No. 288,212, filed July 29, 1981, a single mode unpolarized light beam has been used to generate the contra propagating waves in the single mode fiber loop. The unpolarized light permits the non-reciprocal phase shift between the counter propagating waves to be eliminated without employing a polarization analyzer or other special equipment. Additionally, by using unpolarized light the output amplitude of the sensor is not affected by variations in environmental conditions when the phase difference between the counter propagating waves is an odd multiple of $(\pi/2)$.

An object of the present invention is an improved method of sensing rotation through use of fiber optics.

Another object of the invention is an improved fiber optic rotation sensor.

Yet another object of the invention is a fiber optic rotation sensor having improved power coupling and reduced coherent back scattering and reduced non-linear effects.

Still another object of the invention is a fiber optic rotation sensor having increased environmental stability.

Another object of the invention is a fiber optic rotation sensor which is economical to produce.

A feature of the invention is a rotation sensor which utilizes a multimode light wave which is transmitted through a multimode optical loop.

Applicants have discovered that the advantages in using unpolarized light in a single mode system can be realized in a multimode system, also, using unpolarized light, along with the attendant advantages derived from using a multimode source and optical fiber including an improved power coupling and reduced back scattering along with economy of fabrication.

The invention and objects and features thereof will be more readily apparent from the following detailed description and appended claims when taken with the drawing, in which:

FIG. 1 is a plot of normalized output intensity versus phase shift in a fiber optic rotation sensor using polarized light.

FIG. 2 is a schematic of a fiber optic rotation sensor in accordance with one embodiment of the present invention which realizes the response curves of FIG. 1.

Figure 3:
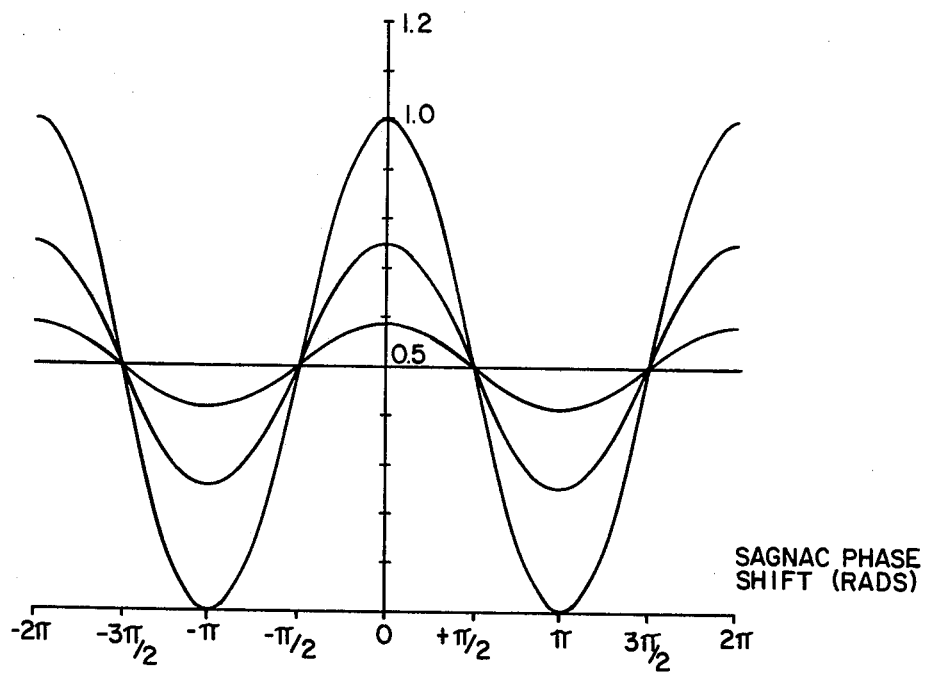
FIG. 3 is a plot of output intensity versus phase shift in a fiber optic rotation sensor using unpolarized light.

Referring now to the drawings, FIG. 1 is a plot of normalized output intensity versus Sagnac phase shift which illustrates the characteristics of the prior art fiber optic rotation sensor employing a single mode light source and single mode optical fibers. The characteristics of reciprocal polarized gyros is that the minimum values of the output are constant at $\pm\pi$ and odd multiples thereof with the maximum values varying in intensity depending on environmental and other extraneous factors. Heretofore the realization of the output characteristics of FIG. 1 employing the single mode polarized light source has required an expensive optical laser and the use of a polarization analyzer within the fiber circuitry to eliminate or minimize phase shift caused by residual birefringence in the optical fiber. The residual birefringence can be large and very sensitive to the environment. Further, the single mode optical fibers are not only expensive, but also the input power coupling is difficult and a significant amount of coherent back scattering of light exists.

FIG. 2 is a schematic of one embodiment of a fiber optic rotation sensor in accordance with the present invention which utilizes a single mode source 10 and a multimode fiber coil 12 which realize the characteristics of FIG. 1 but with increased power coupling. The single mode linearly polarized light from the source 10 is applied through a beam splitter 14 and modal filter 16 to the beam splitter 18. Beam splitter 18 directs two identical waves through the coil 12 in opposite directions, and the waves recombine at the beam splitter 18 and are then passed through modal filter 16 and the beam splitter 14 to a photodiode detector 20. The detector responds to the intensity of the combined waves which depends on the differences in phase between the two counter propagating waves to provide an output signal as illustrated in FIG. 1 which corresponds to the rate of rotation of loop 12.

FIG. 3 is a plot of normalized output intensity versus Sagnac phase shift for another embodiment of the fiber optic rotation sensor in accordance with the invention in which the average value of the output intensity is constant with the maximum and minimum values of the intensity varying. Importantly, since the average value is at the point of maximum slope of the response curves, increased accuracy in measuring the phase shift is realized. By inducing a 90° phase shift in one wave transmitted through the coils relative to the other wave the static, non-rotating readout of the detector is at the constant average value of the response curves of FIG. 3.

Figure 4:
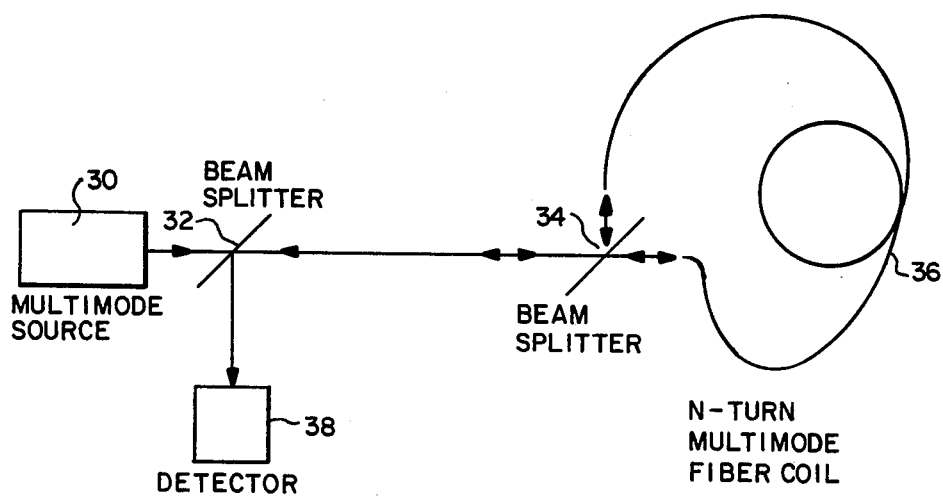
FIG. 4 is a schematic of a fiber optic rotation sensor in accordane with another embodiment of the invention which realizes the response characteristics illustrated in FIG. 3.

FIG. 4 is a schematic of an alternative embodiment of the fiber optic rotation sensor which realizes the response characteristics illustrated in FIG. 3. In this embodiment a multimode source 30 generates a multimode, unpolarized light beam which passes through the directional coupler 32 to a beam splitter 34. The two multimode unpolarized light beams from the beam splitter 34 are then passed in opposite directions through the multimode fiber coil shown generally at 36, similar to the embodiment of FIG. 2. After passing through the coil 36 the two beams are recombined and transmitted through the directional coupler 32 to the photodiode detector 38. Importantly, the multimode source can be a semiconductor device, such as an LED, and again because of the larger numeric aperture of the multimode fiber, increased power coupling is achieved. Reduced coherent back scattering is also achieved by the spatial incoherence of the modes. Since neither a modal filter nor a polarization analyzer is required, the insertion losses therefrom are eliminated.

Following is an analysis of both the polarized and unpolarized fiber optic rotation sensors. The electric field in the multimode fiber can be expanded in the N modes of the fiber as $$E(x,y,z) = \sum_{k=1}^{N} a_k(z) M_k(x,y)$$

where $M_k(x,y)$ is the $k^{th}$ mode and $a_k(z)$ is a complex number representing the amplitude and phase of the $k^{th}$ mode. For quasi-monochromatic light, the correlation between the modes must be specified along with the power in the mode. This is accomplished mathematically by a generalized coherence matrix (4) which is $N \times N$. The $kl^{th}$ term is $$J_{kl} = <a_k(z) a_l^*(z)>$$

where the asterisk (*) and the brackets (<>) denote the complex conjugate and the infinite time average respectively. The generalized coherence matrix has the same properties as the $2 \times 2$ coherence matrix described in Born and Wolfe, *Principles of Optics*, Pergamon Press, 5th Edition, 1975, pp 544–533.

The optical fiber is modeled as a 2N port linear system. The ports are identified with the fiber modes at either end of the fiber. The fiber is described by two transfer matrices $T^{21}$ and $T^{12}$ which characterize propagation from end 1 to 2 and vice versa. The $kl^{th}$ element of these matrices is $$T_{kl}^{21} = r_{kl}^{21} e^{j(\phi_{kl}^{21} + \phi_s/2)}$$

$$T_{kl}^{12} = r_{kl}^{12} e^{j(\phi_{kl}^{12} - \phi_s/2)}$$

where $\phi_s$ is the Sagnac phase shift, $r_{kl}$ is the fraction of the light incident at one end in mode l which exits the other fiber end in mode k, and $\phi_{kl}$ is the phase shift along the path connecting modes l and k. Reciprocity is assumed to hold at rest thus $T_{kl}^{12} = T_{lk}^{21}$. The transfer matrices are unitary if the fiber is lossless. A transfer matrix for the gyroscope can be written in terms of the transfer matrices of the components. The $t_{kl}$'s are environmentally sensitive.

Consider the two configurations of multimode fiber gyros described hereinabove, one using polarized light (FIG. 2) and the other using unpolarized light (FIG. 4), where polarized and unpolarized are defined in terms of the general coherence matrix. For polarized light all of the power is in one mode (i.e., $J_{kl} = \delta_{mk}\delta_{ml}$), while for unpolarized light the power is evenly divided among the modes and the modes are uncorrelated (i.e., $J_{kl} = (1/N)\delta_{kl}$).

The normalized power assuming ideal components is calculated to be $$I_{polarized} = \textstyle\frac{1}{2}(r_{mm})^2 (1 - \cos \phi_s)$$

$$I_{unpolarized} = \textstyle\frac{1}{2} \left[ 1 + \left( \frac{1}{N} \sum_{k=1}^{N} r_{kk}^2 \right)^2 - \right.$$

$$\left. \frac{1}{N} \sum_{k=1}^{N} \sum_{l=1}^{N} (r_{kl}^2)^2 \cos(\phi_{kl}^2) \right\} \cos\phi_s$$

$l \neq k$

The above formalism reduces to the case for single mode fibers by setting $N=2$.

Response curves (I versus $\phi_s$) for multimode fibers are shown in FIGS. 1 and 3 for various values of $T_{kl}$. Note that the response curves are sinusoidal with the positions of the maxima and minima of each curve independent of $T_{kl}$. This indicates reciprocal behavior. For the polarized gyro, the value of the minima are fixed while the value of the maxima depends on $T_{kl}$. In the unpolarized gyro, the average value of the curves is constant, while the maxima and minima expand or contract uniformly about the average value depending on $T_{kl}$. Thus the behavior of polarized and unpolarized multimode gyros has the same basic characteristics as for polarized and unpolarized single mode gyros.

For the polarized gyro, FIG. 2, the insertion loss can be large if the optical fiber scatters the incident power uniformly over the N modes. However, individual modes are sometimes well preserved, which would result in reduced insertion loss. The insertion loss of the unpolarized gyro, FIG. 4, is low due to the absence of mode selective components. All N modes are detected. The large numerical apertures of multimode fibers allow more optical power to be coupled into them than into single mode fibers. This can be important in reducing the effects of detector noise. Further, low cost LED's can be used with multimode fibers, and relaxed alignment tolerances are realized along with use of cheaper fiber. Also coherent backscattering and environmental sensitivity are lower because of averaging over the modes.

While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:
1. A fiber optic rotation sensor comprising:
   a source of light for producing spatially incoherent light;

a coil of multimode optical fiber, means for applying two lightwaves from said source of light through said coil in opposite directions, such that the optical power of said lightwaves is substantially evenly divided among the modes of said multimode fiber;

means for recombining said two lightwaves after passing through said coil, and means for detecting substantially all of the modes of said recombined waves to determine phase shift between said two lightwaves.

2. The fiber optic rotation sensor as defined by claim 1 wherein said light source comprises a multimode light source.

3. The fiber optic rotation sensor as defined by claim 2 wherein said light source comprises a light emitting diode.

4. The fiber optic rotation sensor as defined by claim 1 wherein said means for applying two light beams includes phase shift means for shifting the phase of one of said light beams by 90°.

* * * * *